July 1, 1952
A. BELCHETZ
2,602,021
CATALYTIC PRODUCTION OF CHLORINE
Filed June 30, 1948
2 SHEETS—SHEET 1
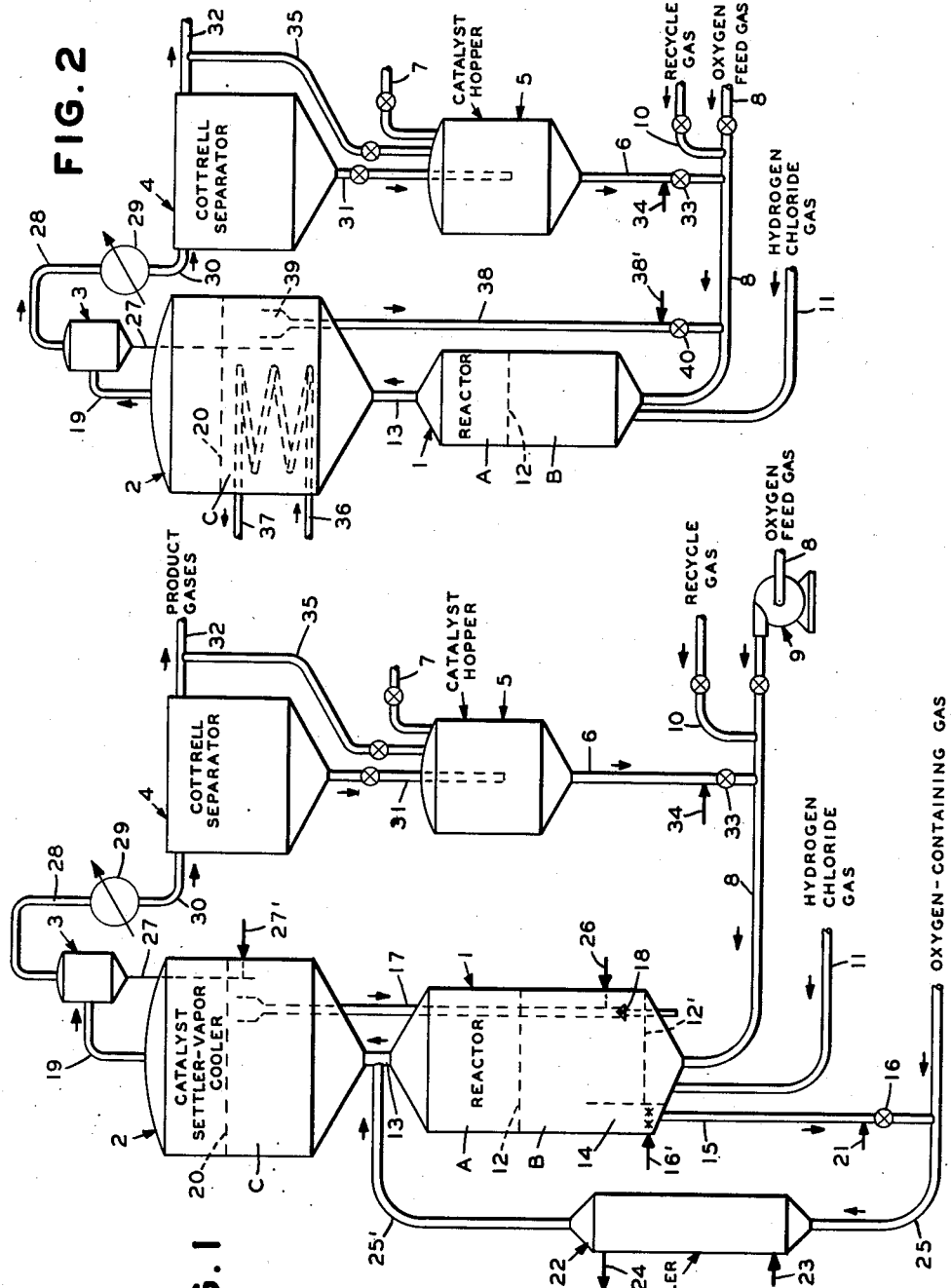
INVENTOR.
ARNOLD BELCHETZ
BY E. F. Liebrecht
G. H. Palmer
ATTORNEYS July 1, 1952  A. BELCHETZ  2,602,021
CATALYTIC PRODUCTION OF CHLORINE
Filed June 30, 1948  2 SHEETS—SHEET 2

INVENTOR.
ARNOLD BELCHETZ
BY
ATTORNEYS

Patented July 1, 1952

2,602,021

UNITED STATES PATENT OFFICE 2,602,021

CATALYTIC PRODUCTION OF CHLORINE

Arnold Belchetz, Larchmont, N. Y., assignor to The M. W. Kellogg Company, Jersey City, N. J., a corporation of Delaware Application June 30, 1948, Serial No. 36,237

19 Claims. (Cl. 23—219)

This application is a continuation-in-part of my co-pending application Serial No. 453,083, filed July 31, 1942, now abandoned.

The present invention relates to the production of chlorine by the oxidation of hydrogen chloride in the presence of a suitable catalyst. Although not limited thereto, the invention is especially advantageous when used for the recovery or regeneration of chlorine from hydrogen chloride produced as a by-product in various known processes such as the chlorination of organic compounds or the pyrolysis or hydrolysis of organic chlorides. One general type of organic reaction is exemplified by the following generalized equations, wherein R represents an organic radical such as the methyl, phenyl or benzyl group:

(1) $RH + Cl_2 = RCl + HCl$ (chlorination)

(2) $RCl + H_2O = ROH + HCl$ (hydrolysis)

(3) $2HCl + \frac{1}{2}O_2 = Cl_2 + H_2O$

Adding the above three equations, the net reaction is (4) $RH + \frac{1}{2}O_2 = ROH$ By the above series of reactions, methylalcohol, phenol or benzylalcohol would be produced from methane, benzene and toluene, respectively.

Similar reactions may be used for the production of aldehydes or organic acids. Thus benzaldehyde or benzoic acid may be produced, respectively, from toluene by the following reactions:

(5) $C_6H_5 \cdot CH_3 + 2Cl_2 = C_6H_5 \cdot CHCl_2 + 2HCl$ (6) $C_6H_5 \cdot CHCl_2 + H_2O = C_6H_5 \cdot CHO + 2HCl$ (7) $C_6H_5 \cdot CH_3 + 3Cl_2 = C_6H_5 \cdot CCl_3 + 3HCl$ (8) $C_6H_5 \cdot CCl_3 + 2H_2O = C_6H_5 \cdot COOH + 3HCl$ Another important application is the production of diolefines from mono-olefines through the intermediate addition of chlorine to the mono-olefine to form the dichloride, and the subsequent pyrolysis of the dichloride to the diolefine and hydrogen chloride. A good example of this process is the production of butadiene from normal butene-2 through the intermediate formation of 2.3 dichlorbutane, (9) $CH_3-CH=CH-CH_3 + Cl_2 =$
$CH_3-CHCl-CHCl-CH_3$

(10) $CH_3-CHCl-CHCl-CH_3 =$
$CH_2=CH-CH=CH_2 + 2HCl$ (pyrolysis)

In all cases the economical operation of these processes requires that the hydrogen chloride be reoxidized to chlorine according to Equation 3, commonly known as the "Deacon" process.

This reaction is strongly exothermic and proceeds with the liberation of 27.4 kilogram calories per gram mol of oxygen consumed in the reaction. Suitable catalysts such as copper chloride are customarily employed to accelerate the reaction. Heretofore, this process has usually been carried out by passing a mixture of hydrogen chloride gas and air through a reaction chamber containing a stationary or fixed bed of the catalyst consisting of copper chloride supported on an inert carrier such as porous bricks. When thus performed, considerable difficulties have arisen in the process in connection with such factors as, (a) temperature control, due to the highly exothermic character of the reaction, (b) the high temperatures necessary to secure a desirable rate of reaction, (c) the tendency of the copper salts used in the catalyst to volatilize at the high reaction temperatures with the consequent loss of these copper salts from the system with the gaseous reaction products, and (d) the separation of chlorine in satisfactory yield and purity from the reaction products.

The primary purpose of the present invention is to provide a process for the production of chlorine by the catalytic oxidation of hydrogen chloride wherein these defects and disadvantages are largely or entirely eliminated.

Another object of my invention is to provide a process wherein the catalyst particles are circulated in the catalytic conversion zone in such manner as to facilitate temperature control.

A further object of the invention is to provide a process wherein the particles of catalyst and/or inert carrier from the conversion zone are cyclically circulated for conversion temperature control and catalyst regeneration.

A further object of the invention is the provision of a process wherein pure oxygen or a gas relatively rich in oxygen may be advantageously and economically used.

In the present process, the feed mixture of hydrogen chloride gas and oxygen-containing gas is contacted with catalytic particles which are maintained in a state of constant movement in the reaction zone, instead of being passed through a fixed bed of the catalytic material as in previous practice. In its preferred aspect, it is contemplated that the process will be practiced by introducing particles of the catalytic material into a conversion zone through which the feed mixture of hydrogen chloride gas and oxygen-containing gas will flow upwardly in intimate contact with the catalytic particles. The velocity of the gases is adjusted so as to maintain the solid particles in a dense turbulent phase which may appropriately be described as being "pseudo-liquid" in character. The velocity of the gas mixture in its travel upwards through the reaction zone is maintained within relatively low limits, the velocity being sufficiently low to permit the particles to form a relatively dense phase but nevertheless sufficiently high to maintain the particles in a highly turbulent condition characterized by an extensive amount of "internal recycle" of the particles throughout the conversion zone. By virtue of this "internal recycle," a comparatively uniform temperature is maintained throughout the dense phase. The particular velocity employed is dependent upon the physical characteristics of the catalyst particles such as size, shape and density. These factors in turn determine the rate at which a particle of given characteristics would fall in a still body of the gaseous mixture, the latter property being designated herein as the "free settling rate" of the particle.

The dense phase of catalytic particles maintained in the conversion zone in the practice of my invention has various properties resembling those of a liquid. For instance by extending a "well-type" opening, which may be a pipe, upwards into the dense phase and below its upper level the solid particles can be withdrawn directly from the dense phase separately from the gas component. The particles may thus be withdrawn downwardly through the pipe by gravimetric flow in a manner analogous to that in which a liquid is withdrawn from a vessel. The internal recycling of the solid particles, which occurs throughout the dense phase, serves to maintain the dense phase at a substantially uniform temperature despite the large quantity of heat evolved by the oxidation of the hydrogen chloride and regardless of the magnitude of the reaction occurring in various portions of the dense phase, thereby largely preventing the formation of "hot spots" in the catalytic material which "hot spots" are characteristic of the reaction when effected in the fixed catalyst bed type of operation. The effect of the internal recycling of catalyst particles in the dense phase is thus somewhat analogous to the circulation produced in a body of liquid through stirring, either mechanically or by aeration with a suitable gas, whereby the liquid is maintained at a uniform temperature during heating.

The catalytic particles are preferably introduced into the conversion zone with a fairly fine degree of particle size. A large proportion of the particles may be 100 microns or smaller in their largest diameter, although larger particles may be employed dependent upon the particular gas velocity maintained. In order to maintain the desired turbulent pseudo-liquid phase, it is considered important to introduce at least a certain proportion of particles of such nature that they will have a free settling rate which will permit their being carried out of the dense phase in true suspension or entrainment in the product gas at the velocity maintained in the conversion zone. The dense catalyst phase may be composed entirely of such small, light particles. In this case the dense pseudo-liquid phase will gradually decrease and will eventually disappear from the conversion zone if the flow of the gas is continued without suitable provision either for separating and returning the entrained particles to the dense phase, or for replacing them by the addition of corresponding amounts of fresh catalyst particles to the conversion zone.

A further feature of the process in its preferred aspects, resides in the withdrawal of a portion of hot catalyst particles from the conversion zone and the circulation of the withdrawn particles through an external cooling zone back to the dense phase, for the purpose of temperature control therein.

An additional preferred feature of the process resides in the introduction of the oxidizing gas component of the feed mixture as substantially pure oxygen in place of the air which is normally used, the oxygen in air being necessarily diluted with nitrogen to the extent of about 80% by volume. The use of substantially pure oxygen is feasible in my process by reason of the simple and accurate temperature control provided, and is advantageous in that it makes possible the recovery of chlorine in substantially pure condition by relatively inexpensive recovery methods.

A further preferred feature of the process resides in the provision of means for recovering catalytic material which may be volatilized during the course of the reaction and will thus be carried out of the conversion zone by reason of the high temperature maintained and the volatile character of the catalyst.

Another feature of the invention consists in the maintenance of the feed mixture of hydrogen chloride gas and oxygen in certain controlled proportions resulting in definite advantages with respect to the yields of chlorine and the recovery of chlorine from the mixture of product gases.

Various other features and advantages of my invention will be apparent from the following detailed description thereof in connection with the appended drawings wherein:

Figure 1 illustrates the process flow and a suitable diagrammatic arrangement of apparatus for effecting the catalytic conversion;

Figure 2 is a view similar to Figure 1 of modified embodiments; and

Figure 3:
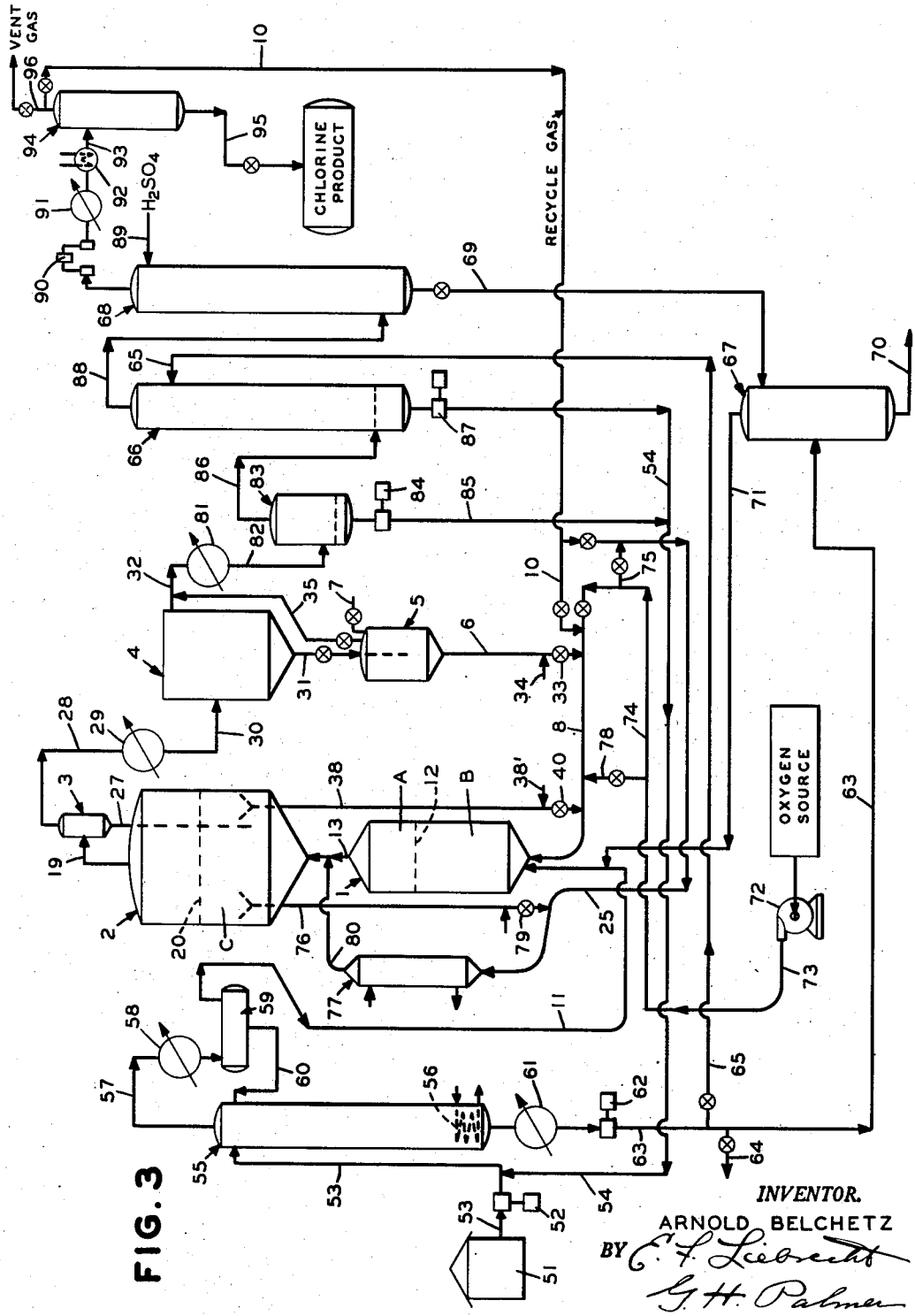
Figure 3 illustrates a complete process flow including units for feed preparation and product recovery and also a modified type of catalytic conversion system.

In Figure 1 the principal elements are a vertically elongated cylindrical catalytic reactor or converter 1 having means at the bottom portion thereof for introducing the feed mixture of hydrogen chloride gas and oxygen-containing air and catalytic particles, suitable means for separating catalytic particles carried out of the converter with the product gas including a catalyst settler-vapor cooler 2, a cyclone separator 3 and a final separator 4 such as a Cottrell precipitator, a catalyst surge hopper 5 for collecting the catalyst particles separated from the product gases in the Cottrell precipitator 4 and suitable means such as a standpipe 6 for transferring the catalytic particles to a gaseous component of the feed.

The particles of catalytic material may be initially supplied to the system at any one of various convenient points, for example, to chamber 2 or to the catalyst surge hopper 5 through the valved inlet 7. From hopper 5 the catalytic particles are fed by standpipe 6 to reactor inlet line 8. Oxygen or a suitable oxygen-containing gas is introduced through line 8 and picks up and carries the solid particles in suspension through this line to the bottom portion of the reactor. The oxygen introduced through line 8 may suitably consist of oxygen introduced from any suitable source by compressor 9, and this gas may also include recycled oxygen gas supplied through line 10 and derived from a subsequent portion of the reaction system as described in connection with Figure 3. The required amount of hydrogen chloride gas is supplied directly to the reactor through line 11 or it may be first injected into line 8.

The dimensions of reactor 1 are so designed with respect to the quantity of gas supplied thereto, or vice versa, that the velocity of the gas mixture in traveling upwardly through the reactor is maintained at a relatively low value adapted to produce the dense pseudo-liquid phase of the catalyst described above. The velocity of the gaseous mixture for a given quantity of feed gas is of course dependent upon the cross-sectional area of the reaction zone. Normally, the dense phase of the catalyst particles exhibits a fairly definite horizontal level indicated by the dotted line 12 in the reaction zone. The space above this level contains a relatively low concentration or "dispersed" phase of the catalytic particles and the space below this level down to the upper side of the lower distributing plate 12' forming the bottom of the reaction zone, consists of the dense turbulent pseudo-liquid phase. It has been ascertained that for a given set of operating conditions such as the maintenance of a particular gas velocity and feed rate of catalytic particles, that the level 12 occurs at a definite distance below the outlet 13 for the product vapors. Accordingly, the reactor is made of a suitable height to provide the required depth of dense phase and contact time of the reactor vapors with the dense phase catalyst. A certain portion of the catalytic particles is constantly carried out of the dense phase, identified as zone B, into the upper dispersed phase, identified as zone A, and a certain proportion of the particles in zone A is carried out of the reactor through line 13. In the type of reaction system shown in Figure 1, I prefer to provide the upper catalyst disengaging space, zone A, of a sufficient height to minimize the quantity of catalytic particles carried out of the reactor with the product gases through the outlet line 13.

Dependent upon the particle size characteristics of the catalyst particles employed, the upward velocity of the gas mixture maintained in the conversion zone is of a relatively low order, normally less than six feet per second (superficial velocity) and usually in the range of about one-half to six feet per second, preferably about one to three feet per second. Velocities of about one-half to three feet per second have been ascertained to be generally suitable with powdered catalytic material consisting entirely or largely of fine particles of 100 microns or smaller in the largest dimension, such as, for example about 20 microns.

By a suitable correlation of the gas velocity and particle size of the catalyst, which may be readily determined by a few experimental runs, the desired dense pseudo-liquid phase is produced, characterized by extensive internal recycling of the catalytic particles throughout the dense phase. A further characteristic of this dense phase is its capacity for flow similar to a liquid. Thus, for example, the catalytic particles may be withdrawn directly from the dense phase by a "well-type" opening 14 shown by a dotted line extending upwardly into the dense phase zone B so as to form, with part of the wall of the reactor, a catalyst withdrawal passageway having its upper opening spaced below the upper level 12 of zone B and its lower opening leading into standpipe 15. Through line 16' a non-corrosive stripping and aeration fluid, which may be oxygen, steam, or a mixture thereof, may be distributed upwardly through the withdrawn catalyst particles in catalyst well 14 to maintain the catalyst in a "fluidized" condition while simultaneously stripping corrosive reaction products therefrom. The position of the upper level 12 of zone B accordingly, if desired, may be adjusted by withdrawing catalyst particles from the dense phase through catalyst well 14 and standpipe 15 at a rate regulated by valve 16 and by regulating the introduction of cooled catalyst through standpipe 17 by valve 18. Due to the extensive internal recycle of the catalyst particles, in the dense phase bed of zone B, the temperature thereof and concentration of the catalytic agent therein is maintained substantially uniform despite the large quantity of heat evolved by the oxidation of the HCl and regardless of the extent to which the reaction proceeds in the various portions of the dense phase zone.

The product gases consist of chlorine, water vapor, and any unreacted hydrogen chloride gas and oxygen, together with any diluent such as nitrogen introduced as an oxygen impurity in the feed mixture. This mixture passes through line 13 to a suitable separator, such as the settler-vapor cooler chamber 2, wherein the entrained catalytic particles are largely separated. Chamber 2 is a vertical chamber arranged in series with the reactor 1 and connected with the latter by line 13 through which the product gases and catalyst are transferred from zone A. Chamber 2 may suitably be of the same general proportions and configuration as the reactor but is preferably of a somewhat larger cross-sectional area to effect a corresponding reduction in the velocity of vapors in their travel therethrough which decreases the tendency of the particles of catalyst to pass out overhead with the vapors through the overhead withdrawal line 19. The velocity of the gases passing through chamber 2 is preferably such as to maintain a bed of catalyst particles therein, identified as zone C, in a dense turbulent pseudo-liquid phase of the same general character as that maintained in the reactor 1 and also having a dispersed phase of catalyst particles above its upper level 20. The bed of catalyst particles in zone C may be maintained at a desired lower temperature by any suitable means such as cooling coils, or other suitable heat transfer means disposed directly therein. However, a preferred method of maintaining a lower desired temperature comprises a procedure, as shown in Figure 1, whereby catalyst particles are withdrawn from zone B of reactor 1 through a standpipe 15, aerated by a fluid injected through line 21. The rate of flow of catalyst through the standpipe is controlled by valve 16. From standpipe 15, the catalyst is circulated to an external cooler 22 by line 25, suspended in a carrier fluid which may suitably be oxygen, hydrogen chloride or a recycle gas, and then passed by line 25' to transfer line 13, wherein it quickly reduces the product vapors and the small amount of suspended catalyst from reactor 1 to the desired temperature. Cooler 22 may consist of a conventional type of tubular heat exchanger through which a cooling medium is circulated by means of inlet pipe 23 and outlet pipe 24.

Additional catalyst may be circulated from zone C through the standpipe 17, the rate of flow being controlled therethrough by a plug-type valve 18, to the reactor for the purpose of replenishing catalyst supply in the reactor and for temperature control therein. Aeration fluid for this standpipe is supplied through line 26.

Pursuant to the foregoing process flow, volatilized catalyst carried out of the conversion zone through line 13 is condensed on particles of inert catalyst carrier material in zone C and eventually returned to the conversion zone through standpipe 17. The temperature maintained in the dense phase catalyst bed of zone C may suitably be of the order of 600°–750° F. compared with a temperature of about 850°–900° F. in the dense phase catalyst bed of zone B in reactor 1. In addition to recovering volatilized catalyst, further conversion of hydrogen chloride to chlorine may be effected during the passage of the product vapors through zone C since the lower temperatures maintained therein are thermodynamically more favorable for the production of chlorine than are the higher temperatures maintained in the conversion zone, although reaction velocity is less favorable at lower temperatures than at the higher temperatures as maintained in the conversion zone.

Returning now to the vapors withdrawn from chamber 2 through line 19. These vapors are passed through cyclone separator 3 wherein entrained catalyst particles are largely separated. These separated particles are returned to the dense phase catalyst bed of zone C by tailpipe, or dip-leg, 27 extending down through chamber 2 and terminating in zone C. From cyclone separator 3 the vapors pass through line 28 to cooler 29 wherein their temperature is lowered but not below the temperature sufficient to condense any of the reactant components of the vapors, for example to about 300° F. The cooled vapors then pass through line 30 to a final separator, the Cottrell precipitator 4, wherein the residual quantity of suspended catalyst particles is separated from the vapors. The separated catalyst particles are transferred from the precipitator by valved line 31 into collecting hopper 5 and then are transferred by means of standpipe 6 to the reactor inlet line 8. The product vapors are withdrawn from the Cottrell separator 4 by line 32 to a suitable recovery system, as described in connection with the following description for Figure 3. Catalyst flowing through standpipe 6, at a rate regulated by valve 33, is suitably aerated to effect proper flow conditions by injection of an aeration fluid into the standpipe through the aeration line 34. Vent line 35 serves to remove vapors from hopper 5.

Figure 2 illustrates a modified embodiment of the catalytic reaction system generally similar to that shown in Figure 1 but embodying an alternate means for withdrawing hot particles of catalyst from the conversion zone, recycling these particles through a cooler zone and back to the conversion zone for catalyst recovery purposes and also embodying a modified type of cooling the catalyst in said cooler zone. The figure likewise illustrates a modified embodiment of the catalytic reaction system embodying the additional feature of means for temperature control in the conversion zone by introducing the feed mixture of hydrogen chloride and oxygen at a suitably low temperature to absorb the excess heat required to maintain the desired reaction temperature. Elements of Figure 2 generally corresponding in their structure and function to elements described in connection with Figure 1, are designated by corresponding reference numerals.

The feed mixture of hydrogen chloride and oxygen is introduced into the dense phase bed at zone B at a relatively low temperature, suitably about atmospheric, and hence serves to absorb heat after its injection into the conversion zone of reactor 1, in excess of that required to maintain the desired reaction temperature suitably about 650° F. to 1000° F. and preferably 750° F. to 900° F., for example, 850 F. In order to provide the desired temperature control, the oxygen-containing component of the feed mixture may be supplied in excess of that stoichiometrically required for the reaction according to the Equation 3 heretofore mentioned. This feed component is employed because it is desirable with a catalyst of the cupric chloride type to provide for an appreciable concentration of oxygen at all times in the reacting vapors to prevent the catalyst from having a tendency to be reduced to its cuprous state. It is preferable, therefore, to employ a ratio of hydrogen chloride to oxygen in the feed from 1/1 to 4/1 by volume, for example, of the order of 1.7 to 1.

The reactor 1 and chamber 2 illustrated in Figure 2 are generally similar in structure and function to reactor 1 and chamber 2 of Figure 1 such as, for example, chamber 2 again is provided with a relatively enlarged cross-sectional area compared with that of reactor 1 whereby a decrease in velocity of the gases passing from the latter to the dense catalyst phase of the former vessel is produced and the separation of the solid particles from the product vapors thereby facilitated. A feature of this arrangement resides in the circulation of a cooling liquid through a coil in the dense phase catalyst bed of chamber 2, entering the coil through line 36 and leaving by line 37, by means of which the temperature of said bed is controlled at a suitably lower temperature whereby the product vapors and catalyst particles are cooled and the volatilized catalytic agent condensed on the particles of inert carrier. A portion of the catalyst particles may be withdrawn from the dense catalyst phase of chamber 2 to line 8 through standpipe 38, which has its upper opening 39 directly in the dense catalyst phase, at a rate regulated by valve 40 and circulated back to the conversion zone. To these circulated catalyst particles from chamber 2 may be added catalyst particles separated in the Cottrell separator 4, the latter particles being transferred back to the conversion zone by way of hopper 5, standpipe 6 and line 8. Inasmuch as the catalyst flowing through standpipe 38 is at a temperature substantially below conversion temperature the heat absorptive capacity of the catalyst particles are utilized to aid the temperature control function of the feed mixture.

Figure 3 illustrates a complete process flow including a further modified embodiment of the catalytic conversion system, and also including suitable apparatus for preparation of the feed stock and apparatus for the recovery and separation of the chlorine product.

The catalytic reaction system illustrated in Figure 3 includes the feature of recycling a portion of the circulated catalytic particles through an external cooling zone and returning them to the conversion zone for temperature control therein, and also the additional feature of utilizing a bed of the circulated particles maintained at a relatively low temperature for the condensation and recovery of volatilized portions of the catalytic material carried out of the reaction zone with the product gases. Elements of Figure 3 corresponding generally to those described in connection with the previous figures as designated by corresponding numerals.

In this flow hydrogen chloride, designated also as HCl, is supplied to the system as a solution in water in a fairly concentrated condition, for example about 32%. The feed is introduced from storage tank 51 by pump 52 through line 53. A supplementary amount of HCl solution derived from the product recovery system may be introduced to line 53 by line 54. From line 53 the solution passes to HCl gas stripper 55. Heat is supplied to stripper 55 by means of reboiler 56 disposed in the lower portion thereof, and HCl gas and some water are removed as vapor overhead from the top of the stripper tower through line 57. The overhead gases are cooled in condenser 58 and enter the reflux drum 59 from which any condensate, consisting of a solution of HCl in water is refluxed back to stripper 55 through line 60.

The uncondensed vapors consisting essentially of HCl with a trace of water, such as 2% or less, are then introduced to the lower portion of the catalytic reactor through line 11. The liquid leaving the bottom of the stripper will be a constant boiling mixture of HCl and water containing approximately 18 to 20% HCl. This constant boiling mixture is cooled in cooler 61 and transferred by pump 62 through line 63, a portion thereof being withdrawn from the system through line 64 and a further portion transferred through line 65 to the hydrogen chloride absorber 66. In the event it is desired to recover the HCl constituent of the constant boiling mixture in line 63, this material may be dehydrated by any suitable means, but preferably by being introduced to an azeotrope-breaking tower, or dehydrator, 67 and contacted therein with H2SO4—H2O solution removed from the bottom of the chlorine dehydrating tower 68 by line 69. After employment in the dehydrating operation the

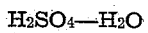

solution is taken through line 70 to undergo a reconcentration step for acid recovery. Inasmuch as the HCl is recovered overhead from the azeotrope-breaking tower through line 71 as substantially dehydrated HCl containing 2% or less water, it may be added to the HCl feed stock flowing through line 11 to the conversion zone.

The oxygen required for the reaction may be supplied as atmospheric air or as purified oxygen more or less nitrogen-free. Any nitrogen or other inert gas introduced along with the oxygen is vented from the system, usually after the removal of the chlorine product. Some chlorine will, of course, normally be lost in the vent gas but the amount will be relatively insignificant unless a large quantity of nitrogen is introduced into the process and is present in the vent gas. Such chlorine can be recovered only by costly treatments of the vent gas and in view of this it is desirable to employ oxygen-enriched air, or preferably, substantially pure oxygen.

Oxygen is supplied from any suitable source, such as a "Linde-Frankl" unit, by blower or compressor 72 through line 73 to manifold line 74. Part of the oxygen flows through line 75 and is used to recycle catalyst supplied through standpipe 76 from the overhead settler-vapor cooler chamber 2 through the cooler 77, and part is injected to line 8 to transfer catalyst from standpipes 6 and 38 back to reactor 1. A portion of the oxygen may be supplied through line 78 for injection into line 8 just ahead of the inlet from standpipe 38. The oxygen supply from line 74 is augmented by recycle oxygen entering line 8 from line 10.

The practice of the process is feasible utilizing a range of proportions for the hydrogen chloride and oxygen-containing gas in the feed mixture. Also, the oxygen may be supplied in the feed mixture either as air or as substantially pure oxygen. The proportions of hydrogen chloride gas and oxygen in the feed mixture, for example, may be those stoichiometrically required for the reaction, namely, four parts of hydrogen chloride to one part of oxygen, or proportions departing from these. In the present illustrative example, it is preferred to use a relatively high oxygen concentration in the feed mixture. For this reason, while the hydrogen chloride to oxygen ratio may be within the range of 4:1 to 1:1, it is preferable to conduct the conversion with the hydrogen chloride to oxygen ratio in the feed within the range of 2:1 to 1.5:1.

The pressure maintained in the gas outlet from the reactor may suitably be atmospheric, or somewhat higher than atmospheric, for example, about 10 to 15 pounds per square inch gauge, or higher, thereby providing a sufficient pressure to force the products through the subsequent separating and recovery units. Somewhat higher conversions may be produced by even higher pressures and pressures at about 100 pounds per square inch gauge are not excluded. While this advantage of high conversions may be offset by additional cost of pressure equipment in some instances conversion of the HCl with oxygen in a fluidized catalyst system under such high pressure conditions can be deemed feasible. The temperature maintained in the dense fluidized catalyst phase in reactor 1 may suitably be of the order of about 750 to 900° F. While the lower temperature ranges are thermodynamically more favorable for the production of chlorine than are the higher temperature ranges, the reaction velocity is less favorable. Hence, it becomes expeditious to conduct the conversion reactions at the lowest temperature at which reasonably fast reaction velocities are obtained, for example, at about 850° F. Pursuant to the presently described process it is preferable to conduct the reaction at about 70% HCl conversion. Since the operation is conducted so that conversion is not complete, the described provision is made in the products recovery system for separating the chlorine product from water, oxygen and HCl with which it is mixed in the reactor effluent.

"Gas contact time" designates the time taken for a molecule of the gaseous reactants to pass up through the dense phase of catalyst particles and hence is dependent upon the maintained values of gas velocity and depth of the dense catalyst phase. This contact time may vary over fairly wide limits consistent with the production of reasonably satisfactory conversions. However, in general, contact time within the range of about 10 to 30 seconds are preferred. The powdered catalytic material preferably consists entirely or largely of indiscriminately sized fine particles of 100 microns or smaller in their largest dimension and with such sized catalyst particles superficial vapor velocities are suitably maintained in the range of about one-half to three feet per second as it has been ascertained that a vapor velocity in this range is satisfactory to maintain the dense catalyst phase in the reactor and settler-vapor cooler chamber.

The embodiment of the catalytic system shown in Figure 3 illustrates also the application of the feature of the described process whereby volatilized catalytic material carried out of the conversion zone with the product gases subsequently is condensed and redeposited on to a solid support and returned to the conversion zone. In accordance with this procedure, the product gases containing the volatilized catalyst, as described heretofore, are passed through a dense fluidized phase of the catalytic particles maintained at a temperature substantially lower than that maintained in the conversion zone and sufficiently low to condense the volatilized catalytic agent without substantial condensation of other components of the product gases.

In Figure 3 the catalyst recovery zone consists of the vertical settler-vapor cooler chamber 2 arranged in series flow with the catalytic conversion chamber 1 and connected with the latter by line 13 through which the product gases and catalyst are transferred. As stated, chamber 2 may suitably be of the same general proportions and configuration as the conversion chamber but is preferably of a somewhat larger cross-sectional area to effect a corresponding reduction in the velocity of the product gases in their travel therethrough which decreases the tendency of the particles to pass out overhead with the product gases through the overhead line 19. The velocity of the gases passing through chamber 2 is preferably such as to maintain the bed of catalyst particles below the level 20 therein in a dense turbulent pseudo-liquid phase of the same general character as that maintained in the conversion zone 1. The preferred method of maintaining the bed of catalyst particles at the desired lower temperature comprises a procedure as shown whereby catalyst particles are withdrawn from the bed through a standpipe 76, a rate of flow being controlled therethrough by valve 79, circulated through an external cooler 77 and then passed by line 80 to transfer line 13, thereby quickly reducing the product gases to the desired temperature. Additional catalyst may be circulated from catalyst bed of zone C through the standpipe 38 to the reactor inlet line 8 and carried back to the reactor for the purpose of temperature control therein, in a manner similar to that described in connection with Figure 2. Pursuant to this process flow volatilized catalyst carried out of the reaction zone through pipe 13 is condensed in zone C and eventually returned to the conversion zone B through the inlet line 8. The temperature maintained in the catalyst bed in chamber 2 may suitably be of the order of about 600–750° F. compared with a temperature of about 750–900° F. in the converter.

From the dilute, or dispersed, catalyst phase in the upper portion of chamber 2 above the bed level 20, the product gases, now substantially free of the volatilized catalytic agent, pass through line 19 to the cyclone separator 3. In this separator particles of catalyst are separated from vapors and returned to chamber 2 through the cyclone dip-leg 27. The vapors and residual catalyst particles leave overhead from separator 3 by way of line 28 and are conducted therethrough to cooler 29 wherein their temperature is lowered to about 300° F. The cooled vapors then pass to the Cottrell precipitator 4 by line 30 wherein the residual quantity of suspended catalyst particles is separated from the product gases. The separated particles are transferred from the precipitator into collecting hopper 5 and then are transferred by standpipe 6 to the reactor inlet line 8.

The vapors from the Cottrell precipitator are further cooled in cooler 81, having been introduced thereto by line 32, to a temperature suitable for condensation of most of their water content, for example, a temperature of about 100° F., and then are passed through line 82 to vapor separator 83 where the bulk of the water formed in the reaction is separated from the product vapors. Part of the unconverted HCl will be dissolved in the separated water, and this solution is transferred by pump 84 through lines 85, 54 and 53 back to the HCl stripper 55. The uncondensed gases leaving separator 83 pass through line 86 to the HCl absorber 66 and pass upwardly therethrough in counterflow to the dilute HCl solution supplied through line 65 whereby the remaining unconverted HCl is separated from the product gases by absorption with dilute HCl. HCl solution withdrawn from the bottom of the absorber 66 is transferred by pump 87 through lines 54 and 53 back to stripper 55.

The gases from absorber 66 pass by line 88 into drier 68 where any water vapor present in the gases is removed by absorption in $H_2SO_4$. $H_2SO_4$ is supplied at the upper part of the dehydrator, or absorber, 68 through line 89 and is withdrawn with the absorbed water at the bottom through line 69 wherein it is conducted to dehydrator 67, as stated heretofore. The dry gases taken overhead from dehydrator 68 are compressed by compressor 90 to a pressure varying from about 150 to 400 pounds per square inch gauge, depending upon the amount of oxygen and nitrogen contained therein, for example, 350 pounds is preferable in the presently described process. The compressed gases are then cooled in cooler 91 to a suitably lower temperature of the order of 90–100° F. and are then further cooled by refrigeration in cooler 92 to about 30° F. below zero. The refrigerated gases pass through line 93 to a gas separator 94 wherein liquid chlorine is separated, as the desired product, from the uncondensed gases and withdrawn from the bottom portion thereof through line 95 to storage. Part of the uncondensed gases withdrawn overhead from gas separator 94 may be allowed to escape to the atmosphere through line 96 so as to remove any nitrogen introduced as an impurity with the oxygen. The balance of the gas is recycled through line 10 back to reactor 1 so as to obtain a high efficiency of oxygen consumption.

The catalyst utilized in my process may be of the composition conventionally used for the Deacon process. A suitable active catalyst in the practice of my process may consist of a mixture of cupric chloride ($CuCl_2$) and sodium chloride (NaCl) supported on activated alumina or silica gel. The fine catalytic particles may be obtained by mechanical pulverization or by spray drying.

The following is an example of a procedure followed in the preparation of the catalyst.

*Example*

279 g. of sodium chloride was dissolved in 3700 cc. of water and 635 g. of anhydrous cupric chloride was then dissolved in this solution.

The solution of combined chlorides was used to make a paste with 4115 g. of alumina prepared by heating Alorco aluminum oxide hydrate at 1200° F. for three hours. The calcined hydrate contained 0.6% water. The moist paste was then dried by heating at 600° F. The completed catalyst contained 6% copper as the chloride, and sodium chloride in equal molar quantities to the copper chloride. The catalyst was then reduced to a finely divided powdered condition.

While my process is especially applicable to the production of chlorine from hydrogen chloride, it may likewise be applied to the production of other free halogens from corresponding halogen acid, particularly bromine and iodine, with correspondingly suitable catalytic material.

I claim:

1. A process for producing chlorine by the chemical interaction of hydrogen chloride with an oxygen-containing gas in the presence of a volatilizable solid catalyst, supported on fine particles of catalytically inert carrier material to form powdered catalytic particles which comprises establishing a highly turbulent pseudo-liquid dense phase of the powdered catalytic particles superimposed by a light dispersed phase of said particles in a conversion zone by introducing said catalytic particles into said conversion zone in an amount sufficient to provide a dense pseudo-liquid phase of said particles of the desired depth and flowing a mixture of hydrogen chloride gas and an oxygen-containing gas upwardly through the conversion zone at a relatively low velocity adapted to produce and maintain said dense phase of catalytic particles, at least a portion of said particles having a free settling rate sufficiently low to permit them to be carried out of the dense phase at the maintained low velocity, maintaining conversion conditions in said conversion zone at an elevated temperature and for a period of time sufficient to effect the desired interaction of hydrogen chloride with oxygen and to volatilize at least part of the volatilizable catalyst from said particles, withdrawing vaporous reaction products, with volatilized catalyst admixed therewith, and powdered catalytic particles from the conversion zone and passing said withdrawn products and catalyst and said catalytic particles to a second zone comprising a second turbulent pseudo-liquid dense phase of powdered catalytic particles maintained at a sufficiently lower temperature than said conversion temperature to condense and deposit said volatilized catalyst on the catalytic particles, condensing and depositing said volatilized catalyst on said powdered catalytic particles in said second dense phase thereby recovering the catalyst and regenerating the particles, separating regenerated particles from vaporous reaction products and returning the separated powdered catalytic particles directly from and at the temperature of said second dense phase to said first mentioned turbulent pseudo-liquid dense phase of said particles in said conversion zone in amount and at a rate sufficient to maintain an average catalytic activity of the powdered catalytic particles and control the temperature therein at said elevated temperature.

2. A process for producing chlorine by the chemical interaction of hydrogen chloride with an oxygen-containing gas in the presence of a volatilizable solid catalyst, supported on pulverulent solid particles of a catalytically inert carrier material to form powdered catalytic particles, which comprises establishing a highly turbulent pseudo-liquid dense phase of the powdered catalytic particles superimposed by a light dispersed phase of the powdered catalyst particles in a conversion zone by introducing said catalytic particles into said conversion zone in amount sufficient to provide a dense pseudo-liquid phase of said particles of the desired depth and flowing a mixture of hydrogen chloride gas and an oxygen-containing gas upwardly through the conversion zone at a relatively low velocity adapted to produce and maintain said dense phase of catalytic particles, at least a portion of said particles having a free settling rate sufficiently low to permit them to be carried out of the dense phase and the conversion zone at the maintained low velocity, maintaining conversion conditions in said conversion zone at an elevated temperature and for a period of time sufficient to effect the desired interaction of hydrogen chloride with oxygen and to volatilize at least a part of the volatilizable solid catalyst from said pulverulent solid particles, withdrawing vaporous reaction products, containing volatilized catalyst and powdered catalytic particles, from said light dispersed phase of catalyst particles and from the conversion zone, simultaneously withdrawing powdered catalytic particles directly from said dense phase of catalytic particles in the conversion zone, contacting the last mentioned withdrawn powdered catalytic particles with a vaporous stripping medium, cooling the thus stripped catalytic particles and injecting the cooled particles into said withdrawn vaporous reaction products to reduce the temperature thereof substantially below the elevated temperature of said conversion zone, reducing the temperature then introducing and upwardly flowing said vaporous products at said reduced temperature through a second highly turbulent pseudo-liquid dense phase of powdered catalytic particles at a rate adapted to maintain said second dense phase and provide sufficient time for condensation and deposition of volatilized catalyst on said particles thereby recovering the volatilized catalyst and regenerating the catalytic particles, separating the vaporous reaction products from catalytic particles in said second dense phase and returning regenerated catalytic particles directly from said second dense phase at said reduced temperature to said first mentioned highly turbulent pseudo-liquid dense phase at a rate and in an amount sufficient to maintain catalytic activity of the powdered catalytic particles therein and to control the temperature thereof at said elevated temperature for said conversion conditions.

3. A process for producing chlorine by the chemical reaction of hydrogen chloride with oxygen in the presence of a volatilizable solid catalyst deposited on fine particles of a carrier material to form powdered catalytic particles, which comprises the steps of establishing a highly turbulent pseudo-liquid dense phase mass of the catalytic particles in a first conversion zone, introducing a vaporous feed mixture comprising hydrogen chloride and an oxygen-containing gas into the conversion zone, flowing the vaporous feed mixture upwardly through the dense phase mass therein at a velocity and under conversion conditions at an elevated temperature to react a major proportion of the hydrogen chloride with oxygen and to volatilize at least part of the volatilizable catalyst from the carrier material, withdrawing from the first conversion zone a mixed stream comprising vaporous reaction products, unreacted components of the feed mixture, volatilized catalyst and suspended catalytic particles, combining a relatively cool oxygen-containing gas with the mixed stream thereby producing a second vaporous feed mixture, passing the second feed mixture into a second turbulent pseudo-liquid dense phase mass of catalytic particles in a second conversion zone, flowing vapors of said second feed mixture upwardly through the second dense phase mass at a velocity and under conversion conditions at a temperature lower than said elevated temperature in the first conversion zone to effect further reaction of hydrogen chloride with oxygen and to condense and deposit the volatilized catalyst component of said second feed mixture on catalytic particles in the second dense phase mass thereby recovering the volatilized catalyst and regenerating the particles, returning regenerated catalytic particles directly from the second dense phase mass to said first dense phase mass, separating vaporous reaction products from the second dense phase mass, recovering chlorine and an oxygen-containing gas from the separated reaction products, cooling at least part of the oxygen-containing gas, then combining the cooled part with said withdrawn mixed stream from the first conversion zone as the relatively cool oxygen-containing gas combined therewith.

4. The process of claim 3 in which the vaporous feed mixture to the first conversion zone comprises substantially pure oxygen as the oxygen-containing gas.

5. A process for producing chlorine by the chemical reaction of hydrogen chloride with oxygen in the presence of a volatilizable solid catalyst deposited on carrier material consisting largely of particles not substantially larger than 100 microns, which comprises the steps of establishing a highly turbulent pseudo-liquid dense phase mass of the catalytic particles in a first conversion zone, introducing a vaporous feed mixture, comprising hydrogen chloride and an excess of an oxygen-containing gas in a feed volume ratio of hydrogen chloride to oxygen within the range of 4:1 to 1:1, into the dense phase mass and flowing the vaporous mixture upwardly therethrough at a velocity in the range of 0.5 to 6.0 feet per second and under conversion conditions at an elevated temperature between 750° to 900° F. and at a pressure above 10 pounds per square gauge for a contact time of from 10 to 30 seconds to react a major proportion of the hydrogen chloride with oxygen and to volatilize at least part of the volatilizable catalyst from the carrier material, withdrawing from the dense phase mass a mixed stream comprising vaporous reaction products, unreacted components of the feed mixture, volatilized catalyst and suspended catalytic particles, combining relatively cool oxygen-containing gas with the mixed stream thereby producing a second vaporous feed mixture at a temperature below said elevated temperature of the dense phase mass, passing the second feed mixture into a second turbulent pseudo-liquid dense phase mass of catalytic particles in a second conversion zone, flowing vapors of said second feed mixture upwardly through the second dense phase mass at a velocity within the range of 0.5 to 6.0 feet per second and under conversion conditions at a temperature between 600 to 750° F. for a contact time sufficient to effect further reaction of hydrogen chloride with oxygen and to condense and deposit the volatilized catalyst component of said second feed mixture on catalytic particles in the second dense phase mass thereby recovering the volatilized catalyst and regenerating the particles, returning regenerated catalytic particles from the second dense phase mass to said first dense phase mass, separating vaporous reaction products from the second dense phase mass, recovering chlorine and an oxygen-containing gas from the separated reaction products, cooling at least part of the oxygen-containing gas then combining the cooled part with said withdrawn mixed stream from the first conversion zone as the relatively cool oxygen-containing gas combined therewith.

6. A process for producing chlorine by the chemical interaction of hydrogen chloride with oxygen in the presence of a volatilizable solid catalyst, supported on fine particles of catalytically inert carrier material to form powdered catalytic particles, which comprises establishing a highly turbulent pseudo-liquid dense phase mass of the powdered catalytic particles superimposed by a light dispersed phase of said particles in a first conversion zone by introducing and withdrawing said catalytic particles into and from said conversion zone in an amount sufficient to provide a dense pseudo-liquid phase of said particles of the desired depth and flowing a mixture of hydrogen chloride and an oxygen containing gas upwardly through the conversion zone at a relatively low velocity adapted to produce and maintain said dense phase of catalytic particles, maintaining conversion conditions in said conversion zone at an elevated temperature and for a period of time sufficient to effect the desired interaction of hydrogen chloride with oxygen at a relatively fast reaction rate and to volatilize at least part of the volatilizable catalyst from said particles, withdrawing vaporous reaction products, with volatilized catalyst mixed therewith, and powdered catalytic particles from the conversion zone, passing said withdrawn reaction products and catalyst and said catalytic particles to a second conversion zone comprising a second turbulent pseudo-liquid dense phase mass of powdered catalytic particles, maintaining conversion conditions in said second dense phase mass of catalyst particles at a lower temperature than said first conversion temperature and for a period of time sufficient to effect the desired interaction of the hydrogen chloride with oxygen at a relatively slow reaction rate and to condense and deposit said volatilized catalyst on the catalytic particles, condensing and depositing said volatilized catalyst on said powdered catalytic particles in said second dense phase mass thereby recovering the catalyst and regenerating the particles, separating regenerated particles from vaporous reaction products and returning the separated catalytic particles at the temperature of the second dense phase mass to said first conversion zone in an amount and at a rate sufficient to maintain catalyst activity and to control temperature therein at said elevated temperature.

7. A process for producing chlorine by the chemical interaction of hydrogen chloride with oxygen in the presence of a volatilizable solid catalyst, supported on pulverulent solid particles of a catalytically inert carrier material to form powdered catalytic particles, which comprises establishing a highly turbulent pseudo-liquid dense phase mass of the powdered catalytic particles superimposed by a light dispersed phase of the powdered catalytic particles in a first conversion zone by introducing and withdrawing said catalytic particles into and from said conversion zone in amount sufficient to provide a dense pseudo-liquid phase mass of said particles of the desired depth and flowing a mixture of hydrogen chloride gas and an oxygen-containing gas upwardly through the conversion zone at a relatively low velocity adapted to produce and maintain said dense phase mass of catalytic particles, maintaining conversion conditions in said conversion zone at an elevated temperature and for a period of time sufficient to effect the desired interaction of hydrogen chloride with oxygen at a relatively fast reaction rate and to volatilize at least a part of the volatilizable catalyst from said pulverulent solid particles, withdrawing vaporous reaction products, containing volatilized catalyst and suspended catalytic particles, from said light dispersed phase of catalytic particles and from the first conversion zone, simultaneously separately withdrawing powdered catalytic particles directly from said dense phase mass of catalytic particles in the first conversion zone, cooling the separately withdrawn catalytic particles, mixing the cooled separately withdrawn catalytic particles with said withdrawn vaporous reaction products, introducing the mixture of reaction products and catalytic particles into a second highly turbulent pseudo-liquid dense phase mass of catalytic particles in a second conversion zone, flowing the vaporous reaction products upwardly to the second conversion zone at a relatively low velocity adapted to produce and maintain said second dense phase mass of catalytic particles, to effect the desired interaction of hydrogen chloride with oxygen at a relatively slow reaction rate and to condense and deposit the volatilized catalyst on catalytic particles in said second dense phase mass thereby recovering the volatilized catalyst and regenerating the catalytic particles, separately recovering vaporous reaction products and regenerated catalytic particles from the dense phase mass in the second conversion zone, and returning regenerated catalytic particles at the temperature of the dense phase mass in the second conversion zone to said highly turbulent pseudo-liquid dense phase mass in the first conversion zone in amount and at a rate sufficient to maintain the catalytic activity of the powdered catalytic particles therein and control the temperature thereof at said elevated temperature for said first conversion conditions.

8. A process for producing chlorine by the chemical interaction of hydrogen chloride with oxygen which comprises introducing particles of a powdered catalytic material to a first catalytic conversion zone, flowing vapors of hydrogen chloride and an oxygen-containing gas upwardly through said zone at a velocity adapted to form and maintain a dense turbulent pseudo-liquid phase mass of the catalyst particles in said zone, continuously adding fresh powdered catalyst to said dense phase and continuously withdrawing corresponding amounts of catalyst particles therefrom at a rate adapted to maintain said dense phase mass at the desired depth and the average catalytic activity thereof at a suitable value, maintaining conversion conditions in said first conversion zone at an elevated temperature and for a period of time sufficient to effect the desired interaction of hydrogen chloride with oxygen at a relatively fast reaction rate and to volatilize at least part of the catalyst, withdrawing vaporous conversion products, volatilized catalyst and a suspension of a minor proportion of catalytic particles from the conversion zone, effecting withdrawal of a major proportion of catalyst particles from the conversion zone separately from the vaporous conversion products as a downwardly moving aerated column through a catalyst withdrawal passageway opening directly into said dense phase, stripping vaporous conversion products and volatilized catalyst from said downwardly moving aerated column with a non-corrosive vaporous stripping fluid, introducing the stripped catalyst particles under the pressure head at the base of said column to a stream of oxygen-containing gas, thereafter cooling the last-mentioned stream to a temperature substantially below the elevated temperature in the first conversion zone, then passing the cooled stream into a second dense turbulent pseudo-liquid phase mass of catalyst particles in a second conversion zone, flowing the oxygen-containing gas and the withdrawn conversion products and volatilized catalyst upwardly through said second dense phase of catalyst particles at a velocity adapted to form and maintain the dense turbulent phase at the desired depth, maintaining said second dense phase of catalyst particles at a lower temperature than said elevated temperature in the first conversion zone sufficient to effect the desired interaction of hydrogen chloride with oxygen at a relatively slow reaction rate and to condense and deposit volatilized catalyst on catalyst particles thereby recovering volatilized catalyst and regenerating the catalyst particles, withdrawing vaporous conversion products substantially free of volatilized catalyst from said second zone, separately withdrawing regenerated catalyst particles from said second dense phase as a downwardly moving aerated column through a second catalyst withdrawal passageway opening directly into said second dense phase, introducing said withdrawn regenerated catalyst particles under the pressure head at the base of the last-mentioned aerated column into a vaporous stream of reactant passing to said first conversion zone and passing the catalyst-containing stream of reactant into said first conversion zone.

9. The process of claim 8 in which the regenerated catalytic particles introduced into a vaporous stream of reactant under the pressure head at the base of the second mentioned downwardly moving aerated column and conveyed by the vaporous stream of reactant and introduced into said first pseudo-liquid dense phase mass of catalytic particles in the first conversion zone at substantially the temperature level maintained in the second conversion zone in an amount per unit time substantially equivalent to the total amount of catalytic particles withdrawn from the first conversion zone through said first mentioned downwardly moving aerated column and as said suspension of catalytic particles thereby maintaining said average catalytic activity of the catalytic particles in the first conversion zone and controlling conversion temperature therein at said elevated temperature.

10. A process for producing chlorine by the chemical interaction of hydrogen chloride with oxygen in the presence of a volatilizable solid catalyst, supported on fine particles of catalytically inert carrier material to form powdered catalytic particles which comprises establishing a highly turbulent pseudo-liquid dense phase of the powdered catalytic particles superimposed by a light dispersed phase of said particles in a first conversion zone by introducing and withdrawing said catalytic particles into and from said conversion zone in an amount sufficient to provide said dense phase of the desired depth and flowing a mixture of hydrogen chloride gas and an oxygen-containing gas upwardly through the conversion zone at a relatively low velocity adapted to produce and maintain said dense phase of catalytic particles, at least a portion of said particles having a free settling rate sufficiently low to permit them to be carried out of the dense phase and the conversion zone at the maintained low velocity, maintaining conversion conditions in said conversion zone at an elevated temperature and for a period of time sufficient to effect the desired interaction of hydrogen chloride with oxygen at a relatively fast reaction rate and to volatilize at least part of the volatilizable catalyst from said particles, withdrawing a mixed stream of vaporous reaction products, volatilized catalyst and suspended powdered catalytic particles from the light dispersed phase of said first conversion zone, passing said mixed stream to a second turbulent pseudo-liquid dense phase of powdered catalytic particles, superimposed by a second light dispersed phase in a second conversion zone, said second dense phase being maintained at a temperature lower than said elevated temperature sufficient to effect the desired interaction of hydrogen chloride with oxygen at a relatively slow reaction rate and to condense said volatilized catalyst on the catalyst particles therein and thereby regenerating said particles, continuously withdrawing portions of the catalytic particles from said second dense phase as a downwardly moving aerated column through a catalyst withdrawal passageway opening directly into said second dense phase, continuously introducing the withdrawn catalytic particles from the bottom of said aerated column under the pressure head at the base thereof into a stream of oxygen-containing gas, cooling the last-mentioned stream to a temperature sufficient to control said second dense phase at said lower temperature, continuously reintroducing the cooled stream directly into said second dense phase whereby said second dense phase is maintained at said lower temperature, simultaneously and continuously separating substantially catalyst-free vaporous reaction products and separately removing regenerated catalytic particles from said second dense phase, and continuously returning the last mentioned particles at the temperature of the second dense phase directly to said first conversion zone thereby maintaining catalyst activity of the first dense phase of catalytic particles and controlling reaction conditions therein at said elevated temperature.

11. A process for producing chlorine by the chemical interaction of hydrogen chloride with oxygen in the presence of a volatilizable solid catalyst, supported on fine particles of a catalytically inert carrier material to form powdered catalytic particles, which comprises establishing a highly turbulent pseudo-liquid dense phase of the powdered catalytic particles superimposed by a light dispersed phase of said particles in a first conversion zone by introducing and withdrawing said catalytic particles into and from said conversion zone in an amount sufficient to provide a dense pseudo-liquid phase of said particles of the desired depth and flowing a mixture of hydrogen chloride gas and an oxygen-containing gas upwardly through the conversion zone at a relatively low velocity adapted to produce and maintain said dense phase of catalytic particles, at least a portion of said particles having a free settling rate sufficiently low to permit them to be carried out of the dense phase and the conversion zone at the maintained low velocity, maintaining conversion conditions in said first conversion zone at an elevated temperature and for a period of time sufficient to effect the desired interaction of hydrogen chloride with oxygen at a relatively fast reaction rate and to volatilize at least part of the volatilizable catalyst from said solid particles, withdrawing a mixed stream of vaporous reaction products, volatilized catalyst and suspended powdered catalytic particles from the light dispersed phase in the first conversion zone, passing said mixed stream into a second turbulent pseudo-liquid phase of powdered catalytic particles, superimposed by a second light dispersed phase, said second dense phase being maintained at a lower temperature than said elevated temperature sufficient to effect the desired interaction of hydrogen chloride with oxygen at a relatively slow reaction rate and to condense said volatilized catalyst on the catalytic particles in said second dense phase thereby regenerating said particles, continuously withdrawing catalytic particles from said second dense phase as a downwardly moving aerated column through a catalyst withdrawal passageway opening directly into the second dense phase, introducing the withdrawn catalytic particles from the bottom of said aerated column under the pressure head at the base thereof to a stream of vaporous fluid, cooling the last-mentioned stream, combining the cooled stream with said mixed stream withdrawn from the first conversion zone to provide a combined stream at the temperature of the second dense phase, passing the combined stream upwardly through said second dense phase thereby controlling said second dense phase at its said lower temperature, removing substantially catalyst-free vaporous reaction products from said second dense phase, separately removing regenerated catalytic particles from said second dense phase as a second downwardly moving aerated column through a second withdrawal passageway opening directly into said second dense phase and returning the thus removed catalytic particles directly to said first-mentioned highly turbulent pseudo-liquid dense phase of the powdered catalytic particles.

12. A process for producing chlorine by the chemical interaction of hydrogen chloride with oxygen in the presence of a volatilizable solid catalyst, supported on fine particles of catalytically insert carrier material to form powdered catalytic particles which comprises establishing a highly turbulent pseudo-liquid dense phase of the powdered catalytic particles superimposed by a light dispersed phase of said particles in a conversion zone by introducing said catalytic particles into said conversion zone in an amount sufficient to provide a dense pseudo-liquid phase of said particles of the desired depth and flowing hydrogen chloride gas and an oxygen-containing gas upwardly through the conversion zone at a relatively low velocity adapted to produce and maintain said dense phase of catalytic particles, at least a portion of said particles having a free settling rate sufficiently low to permit them to be carried out of the dense phase at the maintained low velocity, maintaining conversion conditions in said conversion zone at an elevated temperature and for a period of time sufficient to effect the desired interaction of hydrogen chloride with oxygen and to volatilize at least part of the volatilizable catalyst from said particles, withdrawing vaporous reaction products, with volatilized catalyst admixed therewith, from the conversion zone, simultaneously separately withdrawing powdered catalytic particles directly from said dense phase of catalytic particles in the conversion zone, passing the withdrawn products, volatilized catalyst and powdered catalytic particles to a second zone comprising a second turbulent pseudo-liquid dense phase of powdered catalytic particles maintained at a sufficiently lower temperature than said conversion temperature to condense and deposit said volatilized catalyst on the powdered catalytic particles, condensing and depositing the volatilized catalyst on said powdered catalytic particles in the second dense phase thereby recovering the catalyst and regenerating the catalytic particles, separating regenerated catalytic particles from vaporous reaction products and returning the separated regenerated catalytic particles to the first-mentioned turbulent pseudo-liquid dense phase of catalytic particles in the conversion zone.

13. A process for producing chlorine by the chemical interaction of hydrogen chloride with oxygen in the presence of a volatilizable solid catalyst, supported on fine particles of catalytically inert carrier material to form powdered catalytic particles which comprises establishing a highly turbulent pseudo-liquid dense phase of the powdered catalytic particles superimposed by a light dispersed phase of said particles in a conversion zone by introducing said catalytic particles into said conversion zone in an amount sufficient to provide a dense pseudo-liquid phase of said particles of the desired depth and flowing hydrogen chloride gas and an oxygen-containing gas upwardly through the conversion zone at a relatively low velocity adapted to produce and maintain said dense phase of catalytic particles, maintaining conversion conditions in said conversion zone at an elevated temperature and for a period of time sufficient to effect the desired interaction of hydrogen chloride with oxygen and to volatilize at least part of the volatilizable catalyst from said particles, withdrawing vaporous reaction products, with volatilized catalyst and a minor portion of the powdered catalytic particles admixed therewith, from the conversion zone, passing the withdrawn products, volatilized catalyst and the minor portion of the catalytic particles to a second zone comprising a second turbulent pseudo-liquid dense phase of powdered catalytic particles, simultaneously separately effecting withdrawal of a major portion of the catalytic particles from the conversion zone as a downwardly moving aerated column through a catalyst withdrawal passageway opening directly into the first-mentioned dense phase of catalytic particles at a point below the surface thereof, introducing the separately withdrawn catalytic particles under the pressure head at the base of said column into a stream of oxygen-containing gas, cooling the last-mentioned stream, introducing the cooled stream into the second dense phase of powdered catalytic particles in the second zone, maintaining the second dense phase of catalytic particles at a sufficiently lower temperature than said conversion temperature to condense and deposit the volatilized catalyst on catalytic particles, condensing and depositing the volatilized catalyst on the powdered catalytic particles in said second dense phase thereby recovering the catalyst and regenerating the catalytic particles, separating regenerated particles from vaporous reaction products and returning the separated regenerated catalytic particles to the first-mentioned turbulent pseudo-liquid dense phase of catalytic particles in the conversion zone thereby maintaining an average catalytic activity of the powdered catalytic particles in the conversion zone.

14. A process for producing chlorine by the chemical interaction of hydrogen chloride with oxygen in the presence of a volatilizable solid catalyst, supported on fine particles of catalytically inert carrier material to form powdered catalytic particles which comprises establishing a highly turbulent pseudo-liquid dense phase of the powdered catalytic particles superimposed by a light dispersed phase of said particles in a conversion zone by introducing said catalytic particles into said conversion zone in an amount sufficient to provide a dense pseudo-liquid phase of said particles of the desired depth and flowing hydrogen chloride gas and an oxygen-containing gas upwardly through the conversion zone at a relatively low velocity adapted to produce and maintain said dense phase of catalytic particles, at least a portion of said particles having a free settling rate sufficiently low to permit them to be carried out of the dense phase at the maintained low velocity, maintaining conversion conditions in said conversion zone at an elevated temperature and for a period of time sufficient to effect the desired interaction of hydrogen chloride with oxygen and to volatilize at least part of the volatilizable catalyst from said particles, withdrawing vaporous reaction products, with volatilized catalyst and powdered catalytic particles admixed therewith, from the conversion zone, simultaneously separately withdrawing powdered catalytic particles directly from said dense phase of catalytic particles in the conversion zone, passing the withdrawn products, volatilized catalyst and powdered catalytic particles to a second zone comprising a second turbulent pseudo-liquid dense phase of powdered catalytic particles maintained at a sufficiently lower temperature than said conversion temperature to condense and deposit said volatilized catalyst on the catalytic particles, condensing and depositing the volatilized catalyst on said powdered catalytic particles in the second dense phase thereby recovering the catalyst and regenerating the catalytic particles, separating regenerated particles from vaporous reaction products, recovering a cooled oxygen-containing gas from the separated reaction products, separately withdrawing regenerated catalyst particles from the second dense phase as a downwardly moving aerated column through a second catalyst withdrawal passageway opening directly into the second dense phase at a point below the surface thereof, introducing the withdrawn regenerated catalyst particles under the pressure head at the base of the last-mentioned aerated column into a vaporous stream comprising said recovered cooled oxygen-containing gas and passing the catalytic particles in the last-mentioned stream into the first conversion zone as said first-mentioned introduced particles thereto in an amount sufficient to provide the dense pseudo-liquid phase therein.

15. A process for producing chlorine by the chemical interaction of hydrogen chloride with oxygen in the presence of a volatilizable solid catalyst supported on fine particles of catalytically inert carrier material to form powdered catalytic particles which comprises establishing a highly turbulent pseudo-liquid dense phase of powdered catalytic particles superimposed by a light dispersed phase of said particles in a conversion zone by introducing into and withdrawing catalytic particles from said conversion zone in an amount sufficient to provide a dense highly turbulent pseudo-liquid phase of catalytic particles of desired depth and flowing a mixture of hydrogen chloride gas and an oxygen-containing gas upwardly through the conversion zone at a relatively low velocity adapted, in combination with the introduction and withdrawal of catalytic particles, to produce and maintain said dense phase of catalytic particles, at least a portion of said catalytic particles having a free settling rate sufficiently low to permit them to be carried out of the dense phase at the maintained low velocity, maintaining conversion conditions in said conversion zone at an elevated temperature and for a period of time sufficient to effect the desired interaction of hydrogen chloride with oxygen and to volatilize at least part of the volatilizable catalyst from said particles, withdrawing vaporous reaction products, with volatilized catalyst admixed therewith, and powdered catalytic particles from the conversion zone and passing said withdrawn mixture of products and volatilized catalyst and said catalytic particles to a second zone, said catalytic particles being introduced into and withdrawn from said second zone in an amount sufficient to provide a second highly turbulent dense pseudo-liquid phase of said particles of desired depth, maintaining flow of vapors comprising the mixture of vaporous reaction products and volatilized catalyst upwardly through the second zone at a relatively low velocity adapted, in combination with the introduction and withdrawal of catalytic particles to produce and maintain said second dense phase of catalytic particles in said second zone, maintaining the temperature of the dense pseudo-liquid phase of catalytic particles in the second zone at a sufficiently lower temperature than the conversion temperature of the conversion zone to condense and deposit volatilized catalyst on the powdered catalytic particles in said second dense phase, thereby recovering volatilized catalyst and regenerating the catalytic particles, recovering regenerated catalytic particles and passing them into the conversion zone as said catalytic particles introduced thereinto at a temperature sufficient to effect a control in maintaining the temperature in the first dense phase of catalytic particles at said elevated temperature.

16. A process for producing chlorine by the chemical interaction of hydrogen chloride with oxygen in the presence of a volatilizable solid catalyst supported on fine particles of catalytically inert carrier material to form powdered catalytic particles which comprise establishing a highly turbulent pseudo-liquid dense phase of powdered catalytic particles superimposed by a light dispersed phase of said particles in a conversion zone by introducing into and withdrawing catalytic particles from said conversion zone in an amount sufficient to provide a dense highly turbulent pseudo-liquid phase of catalytic particles of desired depth and flowing a mixture of hydrogen chloride gas and an oxygen-containing gas upwardly through the conversion zone at a relatively low velocity adapted in combination with the introduction and withdrawal of catalytic particles, to produce and maintain said dense phase of catalytic particles, at least a portion of said catalytic particles having a free settling rate sufficiently low to permit them to be carried out of the dense phase at the maintained low velocity, maintaining conversion conditions in said conversion zone at an elevated temperature and for a period of time sufficient to effect the desired interaction of hydrogen chloride with oxygen and to volatilize at least part of the volatilizable catalyst from said particles, withdrawing vaporous reaction products, with volatilized catalyst admixed therewith, and powdered catalytic particles from the conversion zone and passing said withdrawn mixture of products and volatilized catalyst and said catalytic particles to a second zone, said catalytic particles being introduced into and withdrawn from said second zone in an amount sufficient to provide a second dense pseudo-liquid phase of said particles of desired depth, flowing an oxygen-containing gas and the mixture of vaporous reaction products and volatilized catalyst upwardly through the second zone at a relatively low velocity adapted, in combination with the introduction and withdrawal of catalytic particles to produce and maintain said second dense phase of catalytic particles in said second zone, maintaining the temperature of the dense pseudo-liquid phase of catalytic particles in the second zone at a sufficiently lower temperature than the conversion temperature of the conversion zone to condense and deposit volatilized catalyst on the powdered catalytic particles in said second dense phase, thereby recovering volatilized catalyst and regenerating the catalytic particles, recovering regenerated catalytic particles and passing them into the conversion zone as said catalytic particles introduced thereto at a temperature sufficient to control the temperature in the first dense phase of catalytic particles at said elevated temperature.

17. A process for producing chlorine by the chemical interaction of hydrogen chloride with oxygen in the presence of a volatilizable solid catalyst supported on fine particles of catalytically inert carrier material to form powdered catalytic particles which comprises establishing a highly turbulent pseudo-liquid dense phase of powdered catalytic particles superimposed by a light dispersed phase of said particles in a conversion zone by introducing into and withdrawing catalytic particles from said conversion zone in an amount sufficient to provide a dense highly turbulent pseudo-liquid phase of catalytic particles of desired depth and flowing a mixture of hydrogen chloride gas and an oxygen-containing gas upwardly through the conversion zone at a relatively low velocity adapted, in combination with the introduction and withdrawal of catalytic particles, to produce and maintain said dense phase of catalytic particles, at least a portion of said catalytic particles having a free settling rate sufficiently low to permit them to be carried out of the dense phase at the maintained low velocity, maintaining conversion conditions in said conversion zone at an elevated temperature and for a period of time sufficient to effect the desired interaction of hydrogen chloride with oxygen and to volatilize at least part of the volatilizable catalyst from said particles, withdrawing vaporous reaction products, with volatilized catalyst admixed therewith, and powdered catalytic particles from the conversion zone and passing said withdrawn mixture of products and volatilized catalyst and said catalytic particles to a second zone, said catalytic particles being introduced into and withdrawn from said second zone in an amount sufficient to provide a second dense pseudo-liquid phase of said particles of desired depth, maintaining flow of vapors comprising the mixture of vaporous reaction products and volatilized catalyst upwardly through the second zone at a relatively low velocity adapted, in combination with the introduction and withdrawal of catalytic particles to produce and maintain said second dense phase of catalytic particles in said second zone, maintaining the temperature of the dense pseudo-liquid phase of catalytic particles in the second zone at a sufficiently lower temperature than the conversion temperature of the conversion zone to condense and deposit volatilized catalyst on the powdered catalytic particles in said second dense phase, thereby recovering volatilized catalyst and regenerating the catalytic particles, recovering regenerated catalytic particles and passing them into the conversion zone as said catalytic particles introduced into said zone at a temperature and in an amount sufficient, in combination with the temperature and amount of hydrogen chloride and oxygen-containing gases introduced thereinto, to maintain catalytic activity and control the temperature in the first dense phase of catalytic particles at said elevated temperature.

18. A process for producing chlorine by the chemical interaction of hydrogen chloride with oxygen in the presence of a volatilizable solid catalyst supported on fine particles of catalytically inert carrier material to form powdered catalytic particles which comprises establishing a highly turbulent pseudo-liquid dense phase of powdered catalytic particles superimposed by a light dispersed phase of said particles in a conversion zone by introducing into and withdrawing catalytic particles from said conversion zone in an amount sufficient to provide a dense highly turbulent pseudo-liquid phase of catalytic particles of desired depth and flowing a mixture of hydrogen chloride gas and an oxygen-containing gas upwardly through the conversion zone at a relatively low velocity adapted, in combination with the introduction and withdrawal of catalytic particles, to produce and maintain said dense phase of catalytic particles, at least a portion of said catalytic particles having a free settling rate sufficiently low to permit them to be carried out of the dense phase at the maintained low velocity, maintaining conversion conditions in said conversion zone at an elevated temperature and for a period of time sufficient to effect the desired interaction of hydrogen chloride with oxygen and to volatilize at least part of the volatilizable catalyst from said particles, withdrawing vaporous reaction products, with volatilized catalyst admixed therewith, and powdered catalytic particles from the conversion zone and passing said withdrawn mixture of products and volatilized catalyst and said catalytic particles to a second zone, said catalytic particles being introduced into and withdrawn from said second zone in an amount sufficient to provide a second highly turbulent dense pseudo-liquid phase of said particles of desired depth, maintaining flow of vapors comprising the mixture of vaporous reaction products and volatilized catalyst upwardly through the second zone at a relatively low velocity adapted, in combination with the introduction and withdrawal of catalytic particles to produce and maintain said second dense phase of catalytic particles in said second zone, maintaining the temperature of the dense pseudo-liquid phase of catalytic particles in the second zone at a sufficiently lower temperature than the conversion temperature of the conversion zone to condense and deposit volatilized catalyst on the powdered catalytic particles in said second dense phase, thereby recovering volatilized catalyst and regenerating the catalytic particles, recovering regenerated catalytic particles and passing them into the conversion zone as said catalytic particles introduced thereinto.

19. A process for producing chlorine by the chemical reaction of hydrogen chloride with oxygen in the presence of a volatilizable solid catalyst deposited on fine particles of a carrier material to form powdered catalytic particles, which comprises the steps of establishing a highly turbulent pseudo-liquid dense phase mass of the catalytic particles in a first conversion zone, introducing a vaporous feed mixture comprising hydrogen chloride and an oxygen-containing gas into the conversion zone, flowing the vaporous feed mixture upwardly through the dense phase mass therein at a velocity and under conversion conditions at an elevated temperature to react a major proportion of the hydrogen chloride with oxygen and to volatilize at least part of the volatilizable catalyst from the carrier material, withdrawing from the first conversion zone a mixed stream comprising vaporous reaction products, unreacted components of the feed mixture, volatilized catalyst and suspended catalytic particles, combining a relatively cool oxygen-containing gas with the mixed stream thereby producing a second vaporous feed mixture, passing the second feed mixture into a second turbulent pseudo-liquid dense phase mass of catalytic particles in a second conversion zone, flowing vapors of said second feed mixture upwardly through the second dense phase mass at a velocity and under conversion conditions at a temperature lower than said elevated temperature in the first conversion zone to effect further reaction of hydrogen chloride with oxygen and to condense and deposit the volatilized catalyst component of said second feed mixture on catalytic particles in the second dense phase mass thereby recovering the volatilized catalyst and regenerating the particles, returning regenerated catalytic particles directly from the second dense phase mass to said first dense phase mass, separating vaporous reaction products from the second dense phase mass, recovering an oxygen-containing gas from the separated reaction products, cooling at least part of the oxygen-containing gas, then combining the cooled part with said withdrawn mixed stream from the first conversion zone as the relatively cool oxygen-containing gas combined therewith.

ARNOLD BELCHETZ.

REFERENCES CITED

The following references are of record in the file of this patent:

UNITED STATES PATENTS

| Number | Name | Date |
|---|---|---|
| 1,355,105 | Canon | Oct. 5, 1920 |
| 1,845,058 | Pier | Feb. 16, 1932 |
| 1,984,380 | Odell | Dec. 18, 1934 |
| 2,299,427 | Rosenstein | Oct. 20, 1942 |
| 2,303,047 | Hemminger | Nov. 24, 1942 |
| 2,312,952 | Balcar | Mar. 2, 1943 |
| 2,376,190 | Roetheli et al. | May 15, 1945 |
| 2,444,289 | Gorin | June 29, 1948 |